United States Patent Office.

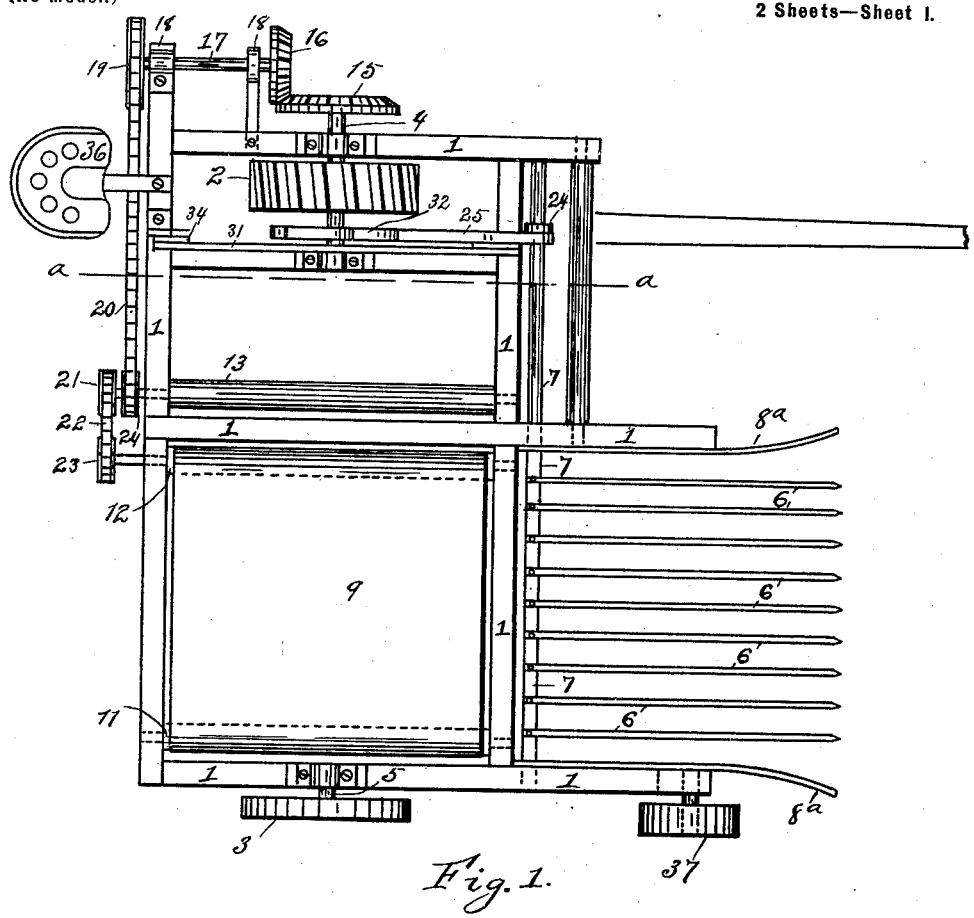

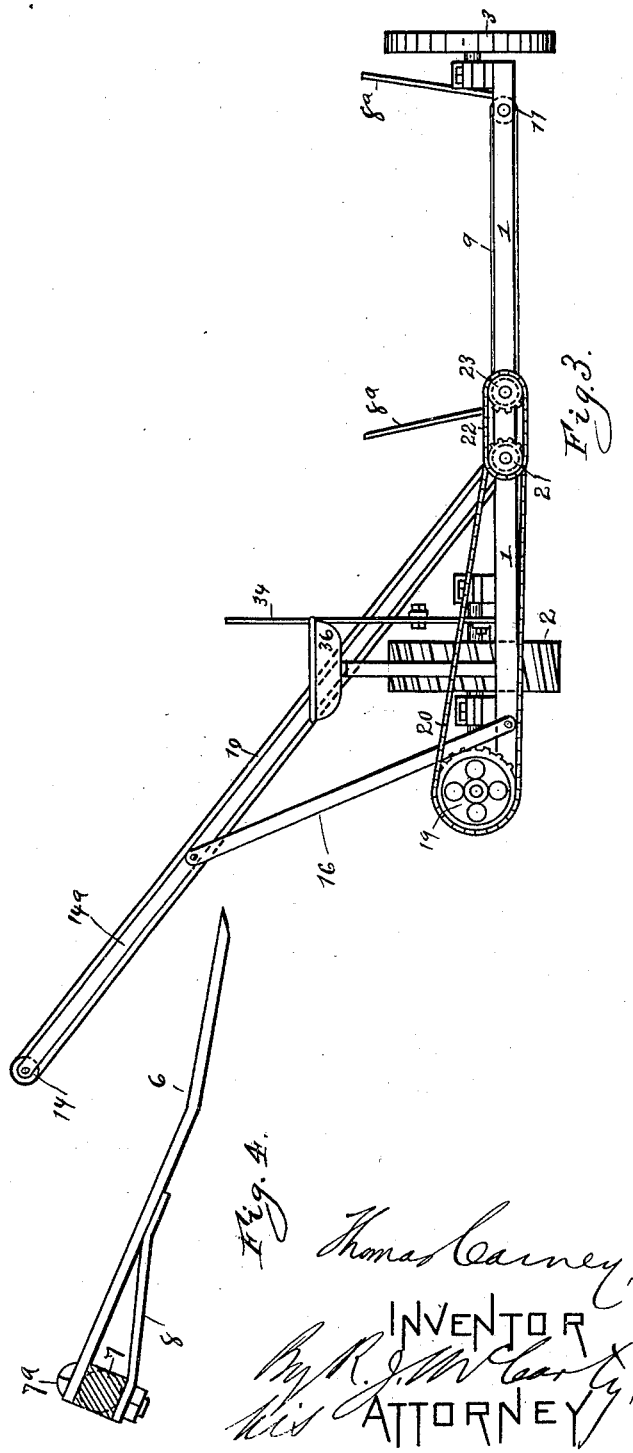

THOMAS CARNEY, OF DAYTON, OHIO.

SHOCK-LOADER.

SPECIFICATION forming part of Letters Patent No. 686,802, dated November 19, 1901.

Application filed September 16, 1901. Serial No. 75,465. (No model.)

*To all whom it may concern:*

Be it known that I, THOMAS CARNEY, a citizen of the United States, residing at Dayton, in the county of Montgomery and State of Ohio, have invented certain new and useful Improvements in Shock-Loaders; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention comprises a shock-loader, and has for its object to provide a machine which may be driven through a field to gather the shocks and transport them from said field.

The invention is designed as a labor-saving machine for the purpose of removing shocks or bundles of grain or hay into wagons to be transported to threshing-machines, barns, or stock, as desired. It does away with field-pitchers, and wagons are loaded therefrom without the team stopping.

Preceding a detail description of my invention, reference is made to the accompanying drawings, of which—

Figure 1 is a top plan view of the shock-loader made in accordance with my invention, one of the carriers being removed. Fig. 2 is a sectional elevation on the line $a\ a$ of Fig. 1. Fig. 3 is an end elevation of the machine. Fig. 4 is a detail view showing the manner of attaching the forks.

In a detail description of the invention similar reference characters indicate corresponding parts.

1 designates the several parts of a rectangular carrying-frame, in which are mounted on shafts 4 and 5 two wheels—to wit, a bull-wheel 2 and a ground-wheel 3—the said wheels 2 and 3 constituting the carrying-wheels of the machine. The shafts 4 and 5 are suitably mounted in the side pieces of the frame.

6 designates a series of forks having suitable curvatures, as shown in Fig. 4, which adapt said forks to enter below the shocks as the machine is being driven. These forks 6 are arranged in parallel relation with suitable intervening spaces.

7 designates a horizontal shaft, a portion of which is square in cross-section in order to permit of a suitable attachment of the forks, the said forks being attached to the upper side of said shaft by means of bolts $7^a$. 8 designates braces which are attached to the lower side of said shaft, the bolts $7^a$ uniting said braces to the shaft in the manner shown in Fig. 4. These braces 8 make contact with the lower sides of the forks at a suitable point about midway of the length of said forks, and thereby suitably support the forks. On each side of said forks there are inclined guideways $8^a\ 8^a$, which are attached to the frame of the machine and guide the shocks onto a rotating carrier 9, which carrier is mounted on rollers 11 and 12, which are journaled in the frame.

10 designates an inclined carrier which is mounted on rollers 13 and 14. The lower end of the carrier 10 is adjacent to an end of the carrier 9, and the said carrier 10 receives the shocks from the last-named carrier and delivers them from the machine. The rollers 11 and 13 have chain-wheels 21 and 23 thereon, the last-named wheel being connected to the first-named wheel by a chain 22. Roller 13 is driven from a chain 20, which passes around a chain-wheel 24 on said roller 13 and is driven from a chain-wheel 19 on shaft 17, mounted in bearings 18 18. Shaft 17 is geared to shaft 4 of the bull-wheel by bevel-wheels 15 and 16, and it will be seen as the machine is driven the bull-wheel 2 imparts the necessary movements to the two carriers through the chain and chain-wheels specified. In the operation of the machine as it is driven through the field to pick up the shocks the carriers are constantly rotated to receive said shocks and deliver them from the machine. The carrier-rollers 13 and 14 are journaled in a frame consisting of side pieces $14^a$, which are supported in an inclined position by braces 16, which are connected to the frame of the machine and said pieces $14^a$. The shaft 7, upon which the forks 6 are mounted, may be rocked in order to suitably elevate said forks in cases where the shocks do not yield freely in entering the forks. This rocking movement is imparted to said shaft 7 by the following mechanism.

24 is a link lever, which is rigidly secured to the shaft 7 at one end of the machine. 25 is a curved lever which is pivoted to said link lever at 27. This link lever 25 has a curved or hook end 26.

28 is a link lever pivoted to the frame at 29. This lever 28 has a pin 30 projecting from it at a right angle, that lies beneath the lever 25, and as lever 28 is moved rearwardly the lever 25 is elevated in the path of a wheel 32, which is mounted on the shaft 4. The wheel 32 constantly rotates with the bull-wheel 2 and has four arms 33 projecting from it, which engage with the hook end 26 of the lever 25 and cause the shaft 7 to rock and thereby elevate the forks 6. It will be understood that when the lever 25 is elevated sufficiently to bring its hook end 26 in the path of one of the arms 33 of the wheel 32 the said lever 25 is tripped by such arm 33 and is instantly released thereby to permit of the forks assuming their lower position. The lever 28, which elevates the lever 25, is connected to a horizontal link lever 31, which link lever 31 has also a pivotal connection with the upright hand-lever 34, which is pivoted to the frame at 35 in proximity to the driver's seat 36.

37 is a ground-roller mounted in the frame on one side of the forks. This ground-wheel 37 is of a suitable diameter to permit of the forks occupying a proper position with relation to the ground in the event that the weight of the forks or the forward end of the machine should be such as to require said ground-wheel 37.

Having described my invention, I claim—

1. In a shock-loader, the combination with a carrying-frame, of a series of forks mounted therein, a rotating carrier mounted adjacent to and in the rear of said forks, another rotating carrier mounted adjacent to said first-named carrier and adapted to carry the shocks to an elevated position, a bull-wheel mounted in said frame and constituting one of the ground-wheels, and gearing interposed between said bull-wheel and the rollers of the carriers whereby the said carriers are caused to rotate during the movement of the machine, substantially as specified.

2. In a shock-loader, the combination with a carrying-frame, a series of forks mounted therein, a horizontal carrier in the rear of said forks and adapted to receive the shocks therefrom, an inclined carrier mounted adjacent to said first-named carrier and adapted to receive the shocks therefrom and to carry them to an elevated position, a bull-wheel mounted in said frame and constituting one of the carrying-wheels, an auxiliary shaft driven from the shaft of said bull-wheel, and chain-gearing interposed between said auxiliary shaft and two of the rollers of said carriers, and means for elevating the forks when such becomes necessary, substantially as specified.

3. In a shock-loader, the combination of a carrying-frame, two rotating carriers mounted therein and adapted to deliver the shocks in an elevated position from the side of the machine, a series of forks adapted to receive the shocks and to deliver them to one of said carriers, a rock-shaft upon which said forks are mounted, lever connections with said rock-shaft, means for elevating said lever connections at predetermined times, and a wheel mounted on the shaft of the bull-wheel and adapted to engage one of said lever connections when the latter is elevated and to thereby actuate the rock-shaft to elevate the forks, substantially as and for the purposes specified.

In testimony whereof I affix my signature in presence of two witnesses.

THOMAS CARNEY.

Witnesses:
A. G. GABRIELSON,
C. J. McCOLLOM.